United States Patent [19]

Hurley

[11] Patent Number: 4,760,491

[45] Date of Patent: Jul. 26, 1988

[54] FAIL-SAFE BRAKE VALVE DRIVER

[75] Inventor: Ralph J. Hurley, Mogadore, Ohio

[73] Assignee: Loral Corporation, New York, N.Y.

[21] Appl. No.: 9,431

[22] Filed: Feb. 2, 1987

[51] Int. Cl.⁴ .................... H01H 47/00; H01H 47/32; F16K 31/02

[52] U.S. Cl. .................................... 361/210; 361/167; 251/129.09; 251/129.10

[58] Field of Search ........................... 244/110 A, 108; 251/129.09, 129.1; 310/95; 361/210; 303/117, 118, 119; 180/65.8; 335/256, 268

[56] References Cited

U.S. PATENT DOCUMENTS 2,989,666  6/1961  Brenner et al. ...................... 361/210
3,870,931  3/1975  Myers .................................. 361/210

Primary Examiner—L. T. Hix
Assistant Examiner—David Porter Field
Attorney, Agent, or Firm—P. E. Milliken; R. L. Weber

[57] ABSTRACT

Fail-safe brake valve driver (10) is provided for controlling a dual coil (A,B) brake valve. A pair of identical circuits (12, 14) are each uniquely associated with one of the brake valve coils. By means of control of an operational amplifier (16) and dual-stage current driver (18), the circuits (12, 14) each provide one-half of the current necessary for achieving brake valve control under normal operations. In the event that one of the coils (A, B) or circuits (12,14) fails, relays (56, 156) are provided for removing the failed circuit or coil from operation and allowing the remaining coil and circuit to carry the full operational load.

13 Claims, 1 Drawing Sheet

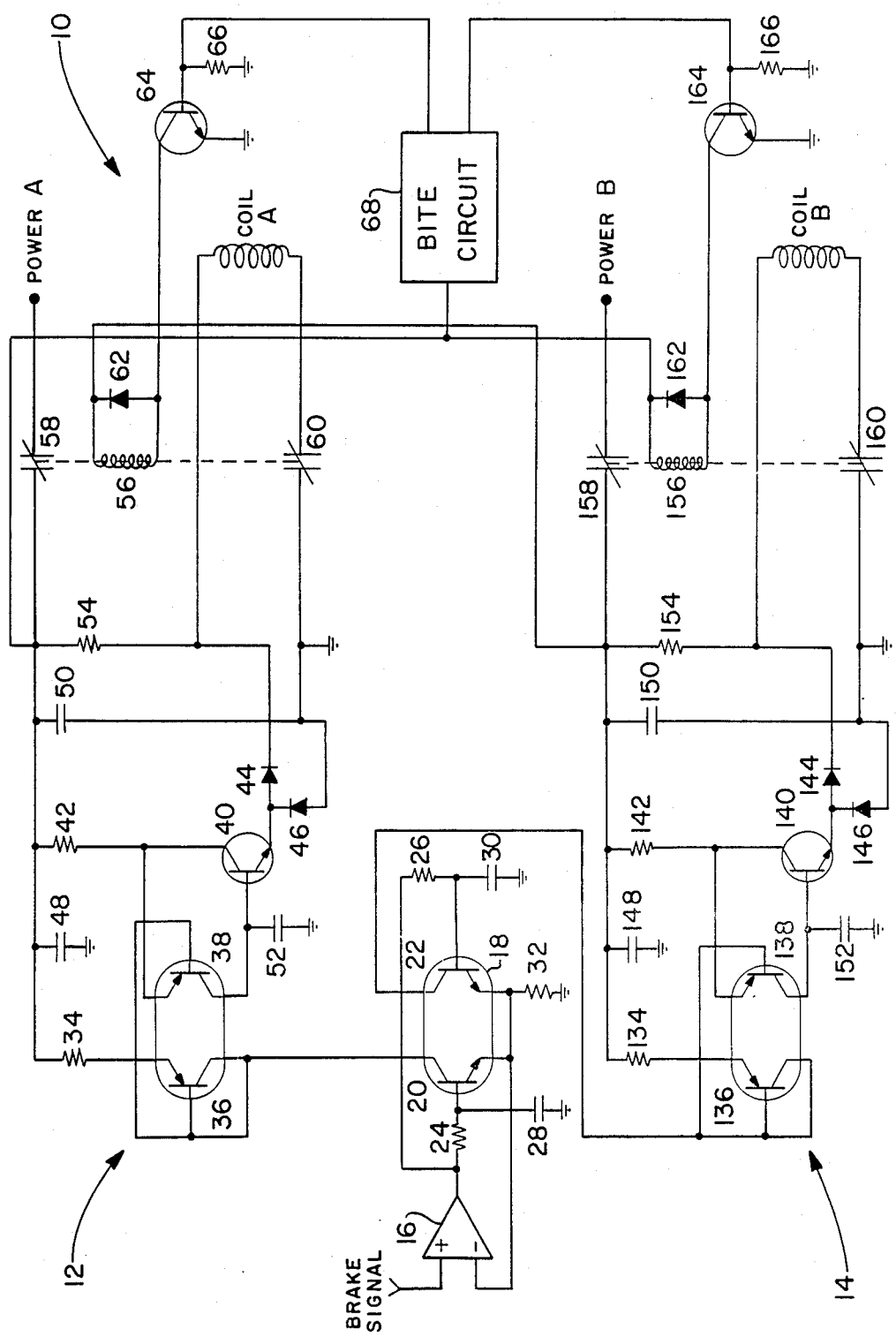

FAIL-SAFE BRAKE VALVE DRIVER

TECHNICAL FIELD

The invention herein resides in the art of braking systems and, more particularly, to a valve driver adapted for implementation with the brake valves of an aircraft.

BACKGROUND ART

It has previously been known to use brake control systems on aircraft, such braking systems incorporating brake valves appropriately driven by a brake signal or error signal such as from an antiskid system, brake-by-wire system, or automatic brake control system. It has also been previously known to provide a redundancy of valve drivers for such systems to assure a continued operation in the event of a single failure. Typically, the redundant valve drivers operate totally independent of each other with only one of the valve drivers operating at a time, even when there has been no failure. Accordingly, the primary valve driver operates to solely provide the braking function until it fails, at which time the redundant circuit takes over full operation. The result is a heavy operational load on the primary circuit during normal operation. The temperature of the circuit increases and its life decreases.

Prior art systems have also been characterized by an interruption in operation at the time at which the redundant valve driver circuit is switched into operation to replace the failed primary valve driver. Because the primary and redundant circuits operate independent of each other, there is no smooth transition from the primary to the redundant circuit.

The prior art has also been found to require larger power supplies for driving the primary and redundant valve driver circuits since each operates exclusive of the other. The prior art circuits of this nature have been found to be current limited with respect to their power supplies unless significantly large power supplies are provided.

DISCLOSURE OF INVENTION

In light of the foregoing, it is a first aspect of the invention to provide a fail-safe brake valve driver which includes a pair of valve driver circuits interposed for safety purposes to assure operation even in the event of a valve driver or valve coil failure.

Another aspect of the invention is the provision of a fail-safe brake valve driver including a pair of identical valve driver circuits which, in normal operation, function in unison and with both of such circuits being adapted to assume full operational control in the event of a failure of the other.

Still a further aspect of the invention is the provision of a fail-safe brake valve driver wherein a pair of current driver circuits are implemented so that neither becomes current limited by its power supply, allowing for more efficient operation over a broader range of power supplies.

Still a further aspect of the invention is the provision of a fail-safe brake valve driver which includes means for testing the pair of driving circuits.

Yet another aspect of the invention is the provision of a fail-safe brake valve driver wherein the operating temperature of the valve driver circuit is greatly reduced, significantly extending the life of the valve drivers.

The foregoing and other aspects of the invention which will become apparent as the detailed description proceeds are achieved by a fail-safe brake valve driver for controlling a dual coil brake valve according to a brake signal, comprising: first means for receiving said brake signal and generating a current signal therefrom, said current signal being proportional to said brake signal; second means connected to said first means for generating a first portion of said current signal; and third means connected to said second means for generating a second portion of said current signal, said first and second portions combined by said first means to form said current signal.

BRIEF DESCRIPTION OF THE DRAWING

For a complete understanding of the objects, techniques, and structure of the invention reference should be had to the following detailed description and accompanying drawing wherein there is shown a schematic diagram of the fail-safe brake valve driver of the invention.

BEST MODE FOR CARRYING OUT THE INVENTION

With reference now to the drawing, it can be seen that a fail-safe brake valve driver according to the invention is designated generally by the numeral 10. As shown, the circuit 10 is connected to drive a dual coil brake valve having coils A and B. As is well known to those skilled in the art, such a brake valve includes a pair of coils which may be used independently or concurrently to control the valve itself. Typically, full power may be applied to either of the coils to achieve the desired actuation, or the power may be equally split between the two coils to achieve the same degree of actuation. As further shown in the drawing, a pair of substantially identical valve driver circuits 12, 14 are provided such that one such circuit is uniquely associated with each of the coils A and B. As will become apparent hereinafter, in normal operation the circuits 12, 14 each provide one half of the total power necessary to achieve the desired valve action to their particularly associated coil. The circuits 12, 14 respectively operate off of their own independent power supplies A and B.

An operational amplifier 16 receives a brake signal at the positive input thereof, such brake signal being from any appropriate source in the aircraft, typically being an antiskid signal or brake control signal. In any event, the brake signal typically is indicative of a request for an increase or decrease in brake pressure or torque in the braking system.

The output of the operational amplifier 16 is passed to a dual stage current driver 18 which includes a transistor 20 uniquely associated with the circuit 12, and a transistor 22 uniquely associated with the circuit 14. The transistors 20, 22 respectively receive the output of the operational amplifier 16 through uniquely associated base resistors 24, 26. Noise filter capacitors 28, 30 are provided to achieve the function which their name implies.

The output or feedback resistor 32 of the current driver 18 is connected in common to the emitters of the transistors 20, 22. The resistor 32 sinks the current from the current drivers to ground as shown. As is well known to those skilled in the art, the voltage at the emitters of the transistors 20, 22, which is the voltage drop across the resistor 32, is equal to the voltage level of the brake signal at the positive input of the operational amplifier 16, since the inputs to an operational amplifier seek to equalize each other. In other words, since the negative input of the operational amplifier 16 is connected to the emitters of the transistors 20, 22, and since the negative input of the amplifier will seek to be equal to the positive input, the voltage drop across the resistor 32 will be equal to the brake signal. By the identical nature of the circuits 12, 14, half of the current necessary to establish the voltage across the resistor 32 is provided through the transistor 20, while the other half is provided through the transistor 22 as will become further apparent hereinafter.

With attention now to the valve driver circuit 12, it will be seen that the current through the transistor 20 is drawn through the resistor 34 from the power source A. This current is proportional to the brake signal as discussed above, one half of the total necessary to fully respond to the brake signal. Such current also passes through the transistor 36 which is connected as a diode to provide temperature compensation to the pre-driver transistor 38. The transistor 38 receives at the base thereof, as a control signal, the output voltage of the transistor 36, such signal again being proportional to the brake signal. A valve driver transistor 40 receives the output of the transistor 38 to drive current set by the value of the resistor 42 to the coil A. It will be noted that the voltage drops across the resistors 34 and 42 are the same. Accordingly, the current through the resistor 42 and transistor 40 to the coil A is a direct function of the current through the transistor 20 and hence a direct function of the brake signal. Obviously, the resistor 42 is selected in value for appropriate scaling.

A diode 44 is provided to shield the transistor 40 from transient spikes emanating from or induced onto the coil A. The diode 46 is provided for snubbing residual current in the coil A after it has been turned off. A number of noise filter capacitors 48, 50, 52 are provided throughout the circuit 12 for purposes of eliminating noise in the circuit.

It will be noted that the valve driver circuit 14 is substantially identical to the circuit 12 discussed above, with the elements 134-146 of the circuit 14 being substantially identical to the corresponding elements 34-46 of the circuit 12. The circuit 14 is operative to control the coil B of the brake control valve and is operative off of the power supply B as shown.

Balance resistors 54 and 154 are respectively provided in the circuits 12, 14 to compensate for manufacturing differences in the transistors 40, 140 at the low power end of operation. While these resistors may be of different values for purposes of achieving the desired balance, the remaining elements of the circuits 12, 14 are substantially identical such that the circuits 12, 14 operate in exactly the same fashion. For any brake signal input, half of the current necessary for achieving the desired braking result is provided through the circuit 12 to the coil A and the other half of the current is provided to the circuit 14 to the coil B. Accordingly, in normal operation there is low power drain on the power supplies A and B and the circuits 12, 14 will not have a tendency to overheat, significantly prolonging the life of the total system 10. As discussed above, the total amount of current to the coils A and B is determined by the voltage drop across the resistor 32 which seeks to equal the brake signal. The current necessary for such voltage drop is equally provided by the circuit 12 through the transistor 20 and by the circuit 14 to the transistor 22.

As shown in the drawing, the circuit 12 includes a relay 56 having contacts 58 interconnected with the power supply A and contacts 60 connected to the coil A. Connected across the relay 56 is a snubbing diode 62. The transistor 64, connected to the relay 56, is operative to energize the relay, thus opening the normally closed contacts 58, 60. A base pull-down resistor 66 is provided in normal fashion. The control signal to the transistor 64 is provided by means of a built-in test equipment (BITE) circuit 68 as will be discussed below.

It should be noted that the circuit 14 is provided with elements designated 156-166 which correspond to the elements 56-66 of the circuit 12. It should further be noted that power supply B from the circuit 14 is supplied through the contact 158 to the coil 56 of the circuit 12 and power supply A from the circuit 12 is supplied through the contact 58 to the coil 156 of the circuit 14. In normal operation, the coils 56, 156 are not energized and the contacts 58, 60 and 158, 160 are closed to allow the circuits to operate in the fashion set forth above. The BITE circuit 68 is adapted to monitor the brake valve coils A, B and the valve driver circuit 12, 14 in previously-known fashion. Should the circuit 68 sense a failure in either the coil A or its drive circuit 12, or in coil B or its drive circuit 14, the faulty circuit may be disabled by actuation of an appropriate relay 56, 156 to open the associated coil A or B with full control and responsibility for operation of the valve driver then being immediately transferred to the remaining circuit 12, 14.

By way of example, should the BITE circuit 68 sense a fault in the coil B or driver 14, the BITE circuit 68 sends an error signal to the transistor 164 which energizes the relay 156 which is connected to the power source A. The energized relay opens the contacts 158, 160, opening both the power supply B and the coil B from the circuit 14. With the circuit 14 inoperative, but with the voltage drop across the resistor 32 still required to equal the brake signal, the current through the transistor 20 doubles, as does the voltage drop across the resistor 34. Accordingly, the voltage drop across resistor 42 doubles, as does the resulting current through the driver transistor 40 to the coil A. Accordingly, operational integrity is maintained despite the failure of the circuit 14. With the power supplies A and B rated to be capable of providing all the power necessary for control of the brake valve, it will be understood that the drain on the power supplies is significantly reduced under normal operation when both the circuits 12, 14 are operating. The result is longer life of the system 10 and a broader range of operating capabilities.

Thus, it can be seen that the objects of the invention have been attained by the structure presented hereinabove. While in accordance with the patent statutes only the best mode and preferred embodiment of the invention has been presented and described in detail, it is to be understood that the inventon is not limited thereto or thereby. Accordingly, for an appreciation of the true scope and breadth of the invention reference should be had to the following claims.

What is claimed is:

1. A fail-safe brake valve driver for controlling a dual coil brake valve according to a brake signal, comprising:

first means for receiving said brake signal and generating a current signal therefrom, said current signal being proportional to said brake signal;

second means connected to said first means for generating a first portion of said current signal; and third means connected to said first means for generating a second portion of said current signal, said first and second portions combined by said first means to form said current signal.

2. The fail-safe brake valve driver according to claim 1, wherein said second and third means are respectively connected to first and second coils of said dual coil brake valve.

3. The fail-safe brake valve driver according to claim 2, wherein said first means comprises a dual stage current driver having a first stage connected to said second means and a second stage connected to said third means, said first and second stages drawing equal amounts of current from said respective second and third means.

4. The fail-safe brake valve driver according to claim 2 which further includes fourth means interconnected between said second and third means for selectively disabling one of said second or third means, said remaining one of said second or third means thereafter generating the totality of said current signal.

5. The fail-safe brake valve driver according to claim 4 wherein said second and third means, when not disabled, provide the same current to their respective first and second coils of said dual coil brake valve and, when one is inhibited, the other provides an increased amount of current to its associated coil.

6. The fail-safe brake valve driver according to claim 2, wherein said second and third means are redundant circuits, each generating a current to an associated one of said first and second coils proportional to a said associated first and second portion of said current signal.

7. The fail-safe brake valve driver according to claim 6, wherein said second and third means each comprises a transistor connected to an associated one of said first and second coils, said transistor controlled through said first means for driving a current proportional to said brake signal.

8. The fail-safe brake valve driver according to claim 6, wherein said second and third means are interconnected with switching means for selectively inhibiting either of said second and third means should either of said second or third means evidence a failure.

9. The fail-safe brake driver according to claim 8, wherein said switching means comprises a relay in each of said second and third means, said relay operative to open an associated one of said first and second coils and an associated power supply.

10. The fail-safe brake valve driver according to claim 1, wherein said first means comprises an operational amplifier having an output thereof connected to first and second current drivers.

11. The fail-safe brake valve driver according to claim 10, wherein said first and second current drivers are respectively connected to said second and third means.

12. The fail-safe brake valve driver according to claim 11, wherein said operational amplifier has an input thereof connected to commonly connected outputs of said first and second current drivers.

13. The fail-safe brake valve driver according to claim 12, wherein a voltage at said commonly connected outputs of said first and second current drivers is maintained equivalent to said brake signal.

* * * * *